United States Patent [19]
Garden

[11] Patent Number: 5,352,076
[45] Date of Patent: Oct. 4, 1994

[54] QUICK RELEASE TOOL HOLDER

[75] Inventor: Dale J. Garden, Warren, Mich.

[73] Assignee: Anderson-Cook Incorporated, Fraser, Mich.

[21] Appl. No.: 44,155

[22] Filed: Apr. 8, 1993

[51] Int. Cl.$^5$ .................... B23D 41/00; B23B 29/04
[52] U.S. Cl. ...................................... 409/287; 279/83
[58] Field of Search ............... 483/59; 279/133, 76, 279/83; 409/268, 287

[56] References Cited

U.S. PATENT DOCUMENTS

| | | | |
|---|---|---|---|
| 92,541 | 7/1869 | Peat | 279/83 |
| 1,021,848 | 4/1912 | Rindfleisch | 279/18 |
| 1,330,532 | 2/1920 | Hazelton | 279/83 |
| 1,440,903 | 1/1923 | Bennett | 279/16 X |
| 2,355,286 | 8/1944 | Fink | 279/83 X |
| 2,362,053 | 11/1944 | Danielson | 279/83 X |
| 2,733,073 | 1/1956 | Phillips | 279/9 |
| 2,772,094 | 11/1956 | Jamilkowski | 279/16 |
| 2,825,572 | 3/1958 | Sloan | 279/116 |
| 2,833,544 | 5/1958 | Blades | 279/6 |
| 2,938,698 | 5/1960 | Johnson | 279/83 X |
| 4,621,821 | 11/1986 | Schneider | 279/83 |
| 4,640,578 | 2/1987 | Turner | 279/133 X |

FOREIGN PATENT DOCUMENTS

| | | | |
|---|---|---|---|
| 254908 | 3/1988 | Fed. Rep. of Germany | 483/59 |
| 55-48549 | 4/1980 | Japan | 279/133 |

Primary Examiner—William Briggs
Attorney, Agent, or Firm—Krass & Young

[57] ABSTRACT

A quick release tool holder assembly including a tool holder defining a circular well, a pair of pads positioned on the tool holder and presenting inboard faces intruding into the well, and a wedge block member movable radially into and out of the well in response to rotation of a hand knob. The associated tool includes a wedge recess sized to receive the wedge tip of the wedge block. The pads are positioned within an angular range of 180° as measured about the central axis of the tool and tool holder and the wedge block is positioned centrally within the remaining 180° as measured around the central axis. The tool may be removed for refinishing or replacement simply by withdrawing the wedge block, moving the tool slightly laterally within the well, and then lifting the tool vertically out the well. The tool may be replaced in the well by repositioning it in the well, moving it laterally against the pads, and moving the wedge block forwardly to insert the wedge tip of the wedge block into the wedge recess in the base of the tool to accurately angularly position the tool within the tool holder.

3 Claims, 5 Drawing Sheets

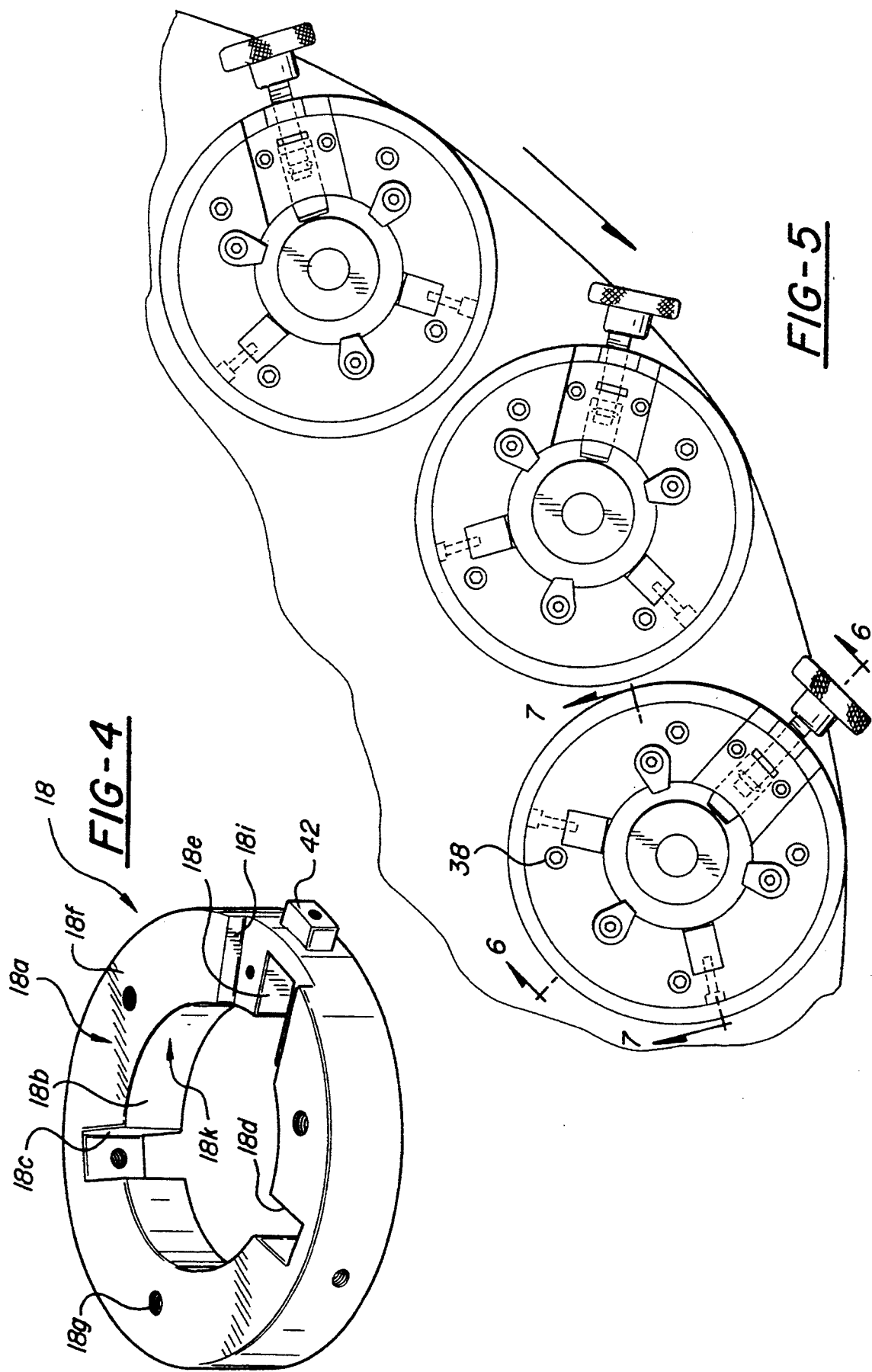

QUICK RELEASE TOOL HOLDER

BACKGROUND OF THE INVENTION

This invention relates to tool holders and more particularly to a tool holder allowing the associated tool to be quickly and readily released for repair or replacement purposes.

Tool holders are in wide use in a wide variety of industrial applications. For example, tool holders are used in association with lathes, drill presses, broaching machines, drills and the like. As one example, tool holders are used in progressive broaching machines in which a series of progressive broaching tools are provided at successive work stations on an index table and a ram is positioned over the index table for coaction with the progressive broaching tools to convert unfinished work pieces into finished work pieces. Broaching may take various forms and may comprise for example the formation of internal or external splines on the work pieces. Typically each broaching tool requires refinishing or replacement on a regular basis. It is important that the tool holder holding the broaching tool include provision for quickly and readily removing the tool from the tool holder for refinishing or replacement and for quickly and accurately repositioning the refinished or replacement tool in the tool holder.

Whereas a variety of tool holders have been utilized in association with various industrial applications, the prior art tool holders are either complex and expensive and/or do not provide quick release of the tool for refinishing or replacement and/or do not provide quick and accurate repositioning of the refinished or replacement tool in the tool holder.

SUMMARY OF THE INVENTION

This invention is directed to the provision of an improved tool holder.

This invention is further directed to the provision of a tool holder having a quick release provision whereby the associated tool may be readily released and removed from the tool holder for refinishing or replacement.

This invention is further directed to the provision of a tool holder allowing ready removal of the associated tool for refinishing or replacement and including provision for quickly and precisely repositioning the refinished or replacement tool in the tool holder.

The invention tool holder is of the type intended for use with a tool having a base and including a recess in the outer periphery of the base, the tool holder defining a well positioned around the central vertical axis of the holder and tool and sized to loosely receive the base of the tool with a plurality of contact members engaging the outer periphery of the tool base at circumferentially spaced locations to position the base within the well.

According to the invention, all the contact members are located within an angular range of 180° as measured around the central axis and the tool holder further includes a locating member having a tip movable radially into and out of the well at a location within the remaining 180° as measured around the axis and sized to fit in the recess in the base of the tool to position the tool angularly with respect to the tool holder. This arrangement allows the tool to be readily removed by simple withdrawal of the locating member and allows the tool to be readily repositioned within the tool holder in concentric relation to the central axis in a precise angular relationship with respect to the tool holder. Specifically, the contact members assure the concentricity of the new tool within the tool holder and the locating member, in coaction with the recess in the tool base, assures precise angular positioning of the new tool with respect to the tool holder.

According to a further feature of the invention, the tip of the locating member has a wedge configuration conforming to a wedge configuration of the recess in the base of the tool. This arrangement allows the wedge faces on the tool and on the locating member to cammingly coact upon radially inward movement of the locating member to precisely angularly position the tool within the tool holder.

According to a further feature of the invention, each contact member comprises a pad having an inboard face positioned in the well. The inboard faces of the pads coact to precisely and concentrically position the tool within the well with respect to the central axis.

According to a further feature of the invention, the base of the tool is circular, the well is circular, and the inboard faces of the pads lie on secants with respect to the circular outline of the well. This arrangement provides a plurality of flat secant surfaces against which the outer periphery of the tool base may seat to ensure the concentric positioning of the tool within the tool holder.

According to a further feature of the invention, the tool holder further includes a plurality of clamps mounted on the tool holder in surrounding relation to the well and adapted to engage an upper annular face of the tool base to preclude upward displacement of the tool out of the well.

In the disclosed embodiment of the invention, the tool holder has an annular configuration in surrounding relation to the well; the locating member comprises a wedge block mounted for radial movement in the annular wall of the tool holder and having a wedge shaped tip adapted for wedging coaction with a wedge shaped recess in the base of the tool; and the pads comprise pad blocks positioned in circumferentially spaced recesses in the annular wall of the tool holder with their inboard faces positioned in the well of the tool holder.

BRIEF DESCRIPTION OF THE DRAWINGS

FIG. 4 is a perspective view of one element of the tool holder assembly;

FIG. 5 is a fragmentary plan view of the index table as seen in FIG. 1;

DETAILED DESCRIPTION OF THE PREFERRED EMBODIMENT

The invention tool holder assembly is suitable for use in any application where a tool is held in a position to perform an industrial processing operation and where the nature of the operation requires that the tool be refinished or replaced on a regular basis. For example, the tool holder assembly of the invention may be utilized in association with a progressive broaching machine of the type shown in applicant's co-pending U.S. patent application Ser. No. 011,234 filed on Jan. 29, 1993.

Figure 1:
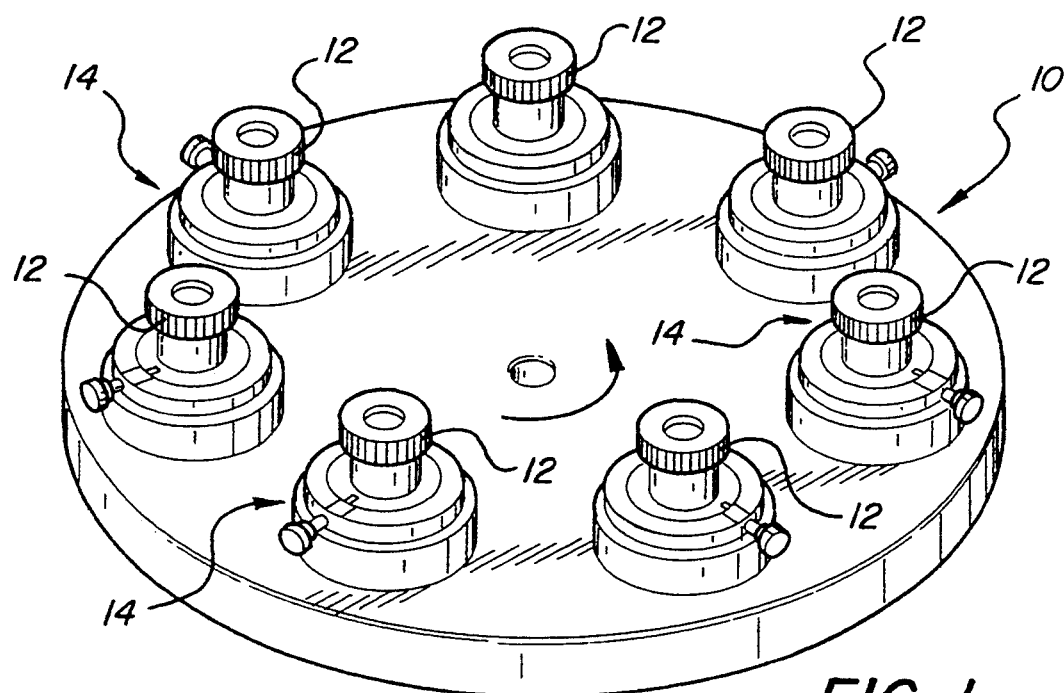
FIG. 1 is a perspective somewhat schematic view of an index table employing tool holder assemblies according to the invention.
Figure 2:
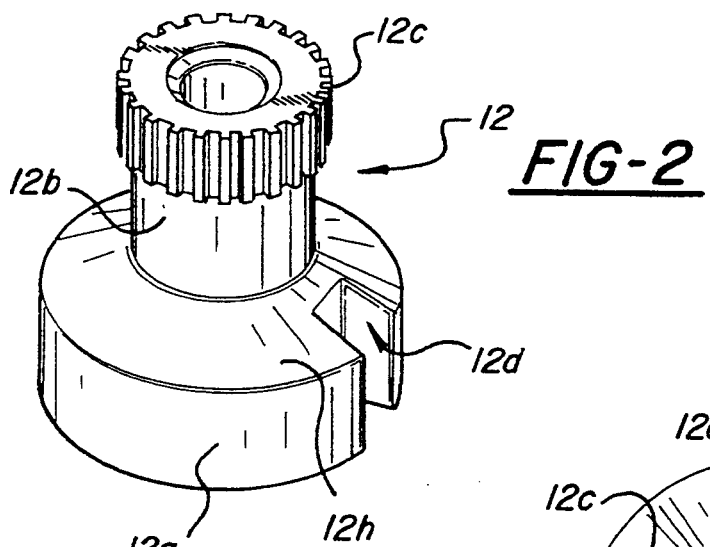
FIGS. 2 and 3 are detail views of a tool utilized in the invention tool holder assembly.
Figure 3:
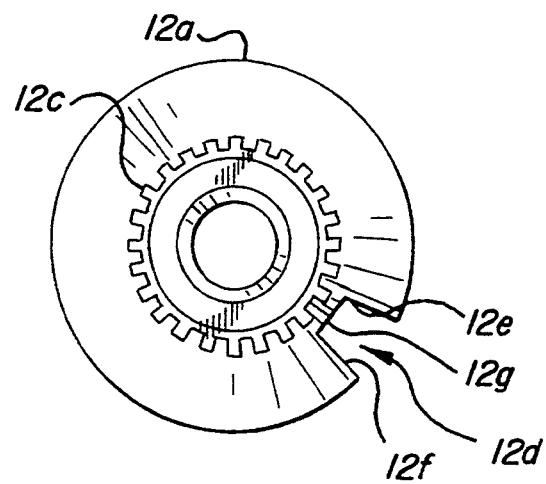
Figure 6:
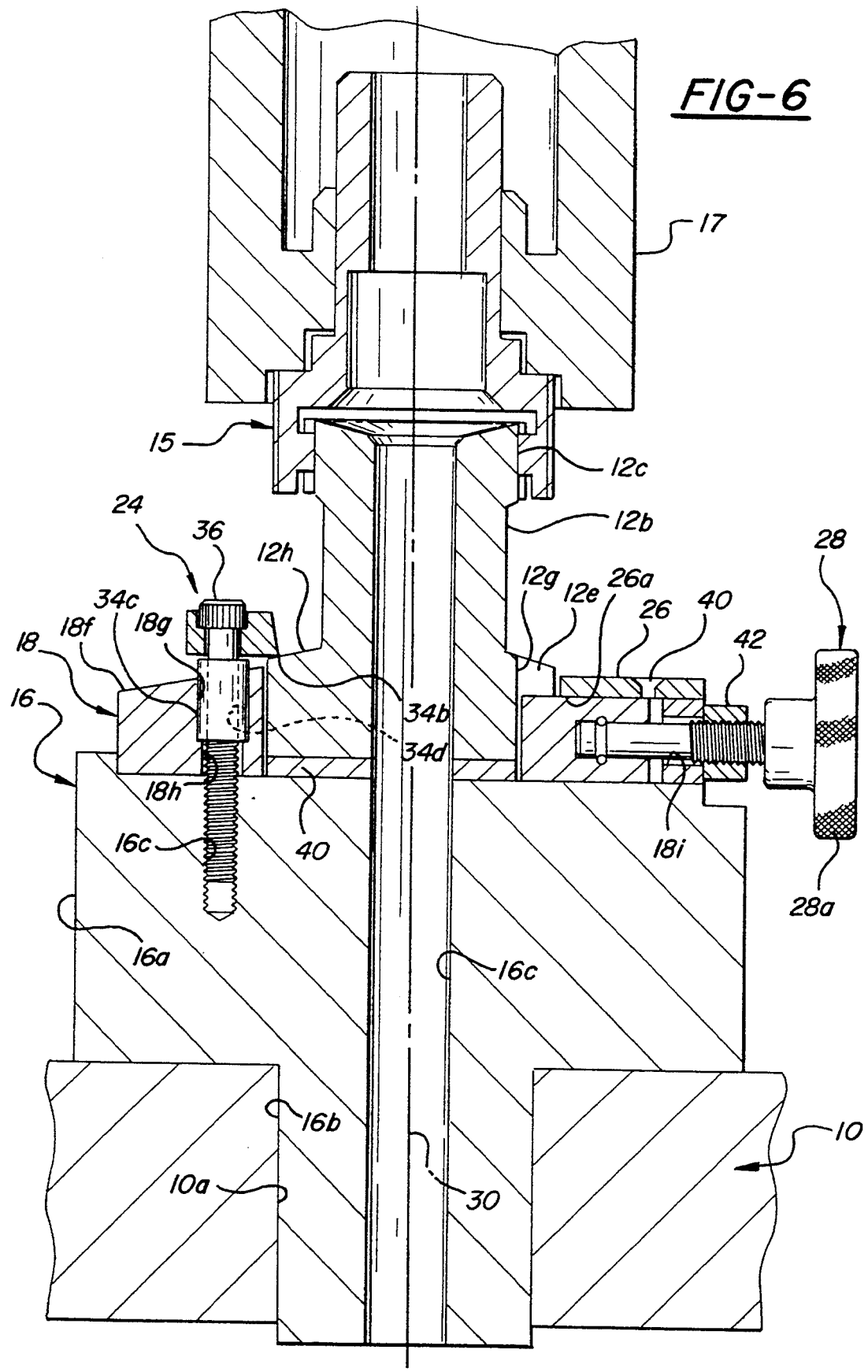
FIGS. 6 and 7 are cross sectional views taken respectively on line 6—6 and 7—7 of FIG. 5.
Figure 8:
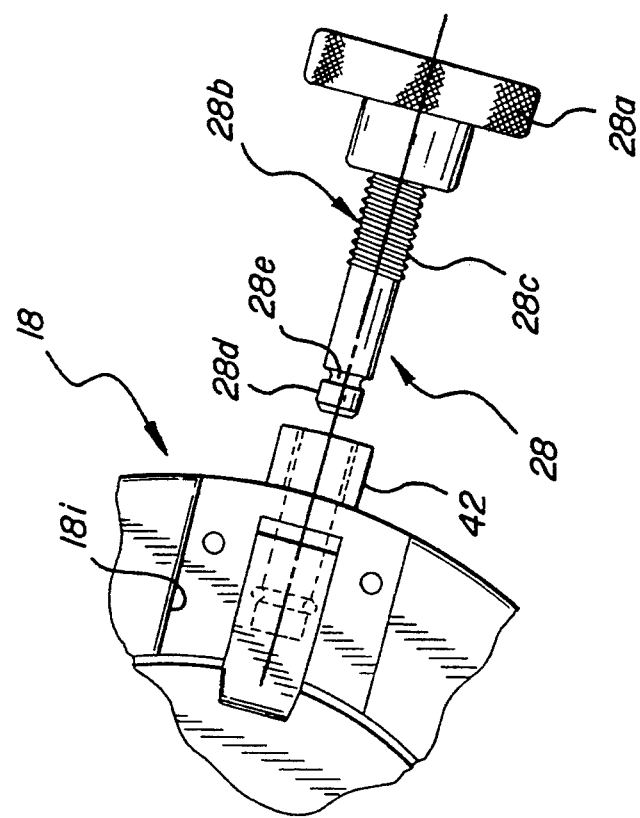
FIG. 8 is a detail view of the invention tool holder assembly.
Figure 7:
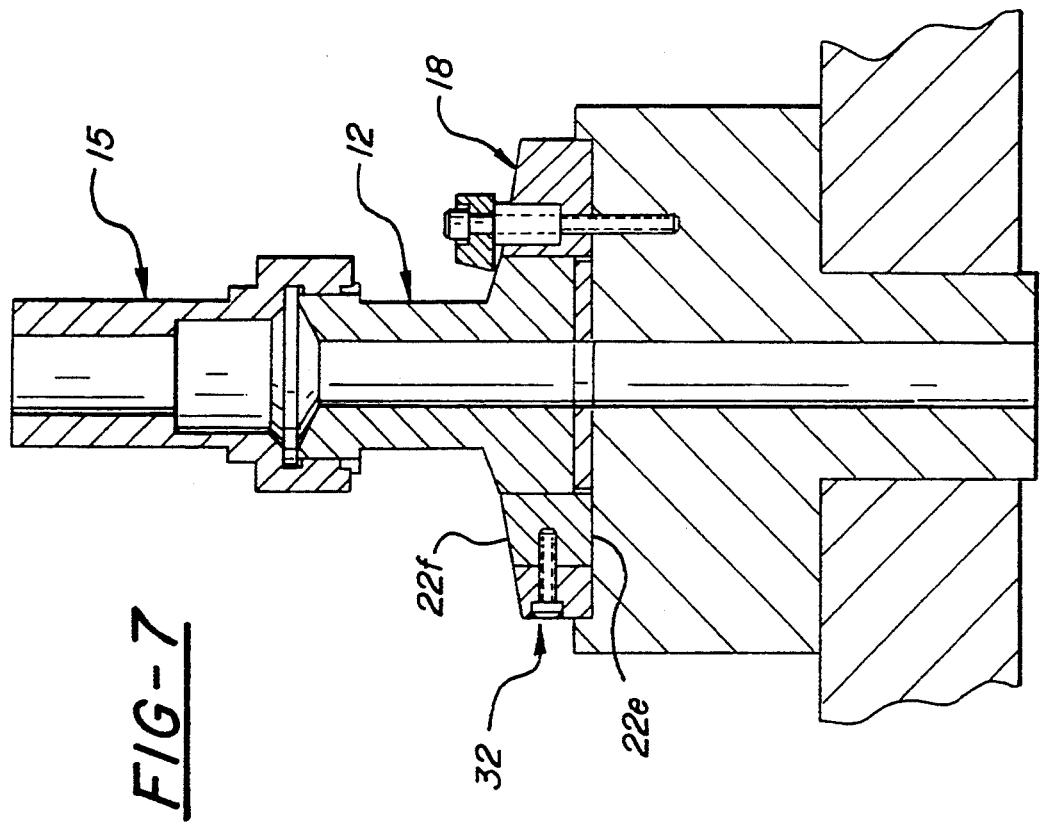

The invention tool holder assembly is seen in FIG. 1 in association with an index table 10 forming a part, for example, of a progressive broaching machine. Table 10 is movable in indexing manner to progressively position a plurality of tools 12 in operative position with respect to a ram of the broaching machine so as to progressively form a part carried by the ram to a configuration conforming to the configuration of the progressive tools. Each tool 12 is removably held in position on the index table by an invention tool holder assembly 14.

It will be understood that the invention tool holder assembly 14 functions to allow the associated tool 12 to be readily removed from the index table for refinishing or replacement and allows for the accurate repositioning of the replacement or refinished tool in the tool holder assembly.

Tool 12 may take various forms and is illustrated as comprising a broaching tool designed for the formation of internal splines on an associated hollow workpiece 15. Tool 12 includes a base portion 12a and an upstanding column portion 12b defining a plurality of external splines 12c in the upper region of the column portion. Workpiece 15 may be held, for example, by a collet 17 carried by a ram (not shown) of the broaching machine so that downward movement of the ram moves the part downwardly over the tool to conform the interior of the part to the configuration of the splines 12c. Base portion 12a has a circular configuration and includes a cutout 12d of wedge configuration including angled wedge walls 12e and 12f and a bottom wall 12g. The annular shoulder 12h defined at the intersection of base portion 12a and column portion 12b has a conical configuration.

Tool holder assembly 14 includes a mounting block 16, a tool holder member 18, a wedge block 20, pad blocks 22, clamp assemblies 24, a cover 26, and a hand knob 28.

Mounting block 16 has a circular configuration and includes an upper main body portion 16a and a reduced diameter lower locating or pilot portion 16b positioned in a locating hole 10a in index table 10 to position the mounting block at a specific angular position relative to the index table. Suitable means (not shown) are provided to preclude rotation of the mounting block relative to the index table. Mounting block 16 has a generally annular configuration including a central bore 16c.

Tool holder member 18 has a generally circular annular configuration including an annular portion 18a defining a circular inner wall surface 18k defining a central opening or well 18b. Well 18b has a diameter slightly exceeding the diameter of the base portion 12a of the associated tool 12. Annular portion 18a further defines radially extending recesses 18c and 18d opening into the well 18b at circumferentially spaced locations and a further radially extending recess 18e opening into the well 18b at a location spaced circumferentially from recesses 18c and 18d. Specifically, with reference to FIG. 9, recesses 18c, d, and e are equally angularly spaced about the central axis 30 of the tool holder member and the tool so that the recesses are spaced 120° apart as measured about central axis 30. With continued reference to FIG. 9, it will be seen that recesses 18c and 18d are thus positioned within an angular range of 180° as measured about axis 30 (within 120° in the disclosed embodiment) and that recess 18e is located within the remaining 180° as measured about axis 30 and, specifically, is located at the midpoint of the remaining 180°. The upper annular surface 18f of annular wall portion 18a has a conical configuration.

Wedge block 20 has a generally rectangular configuration and is sized to fit slidably in recess 18e so as to move radially inwardly and outwardly within recess 18e to move the tip 20a of the wedge block into and out of the well 18b defined by the tool holder member 18.

Figure 9:
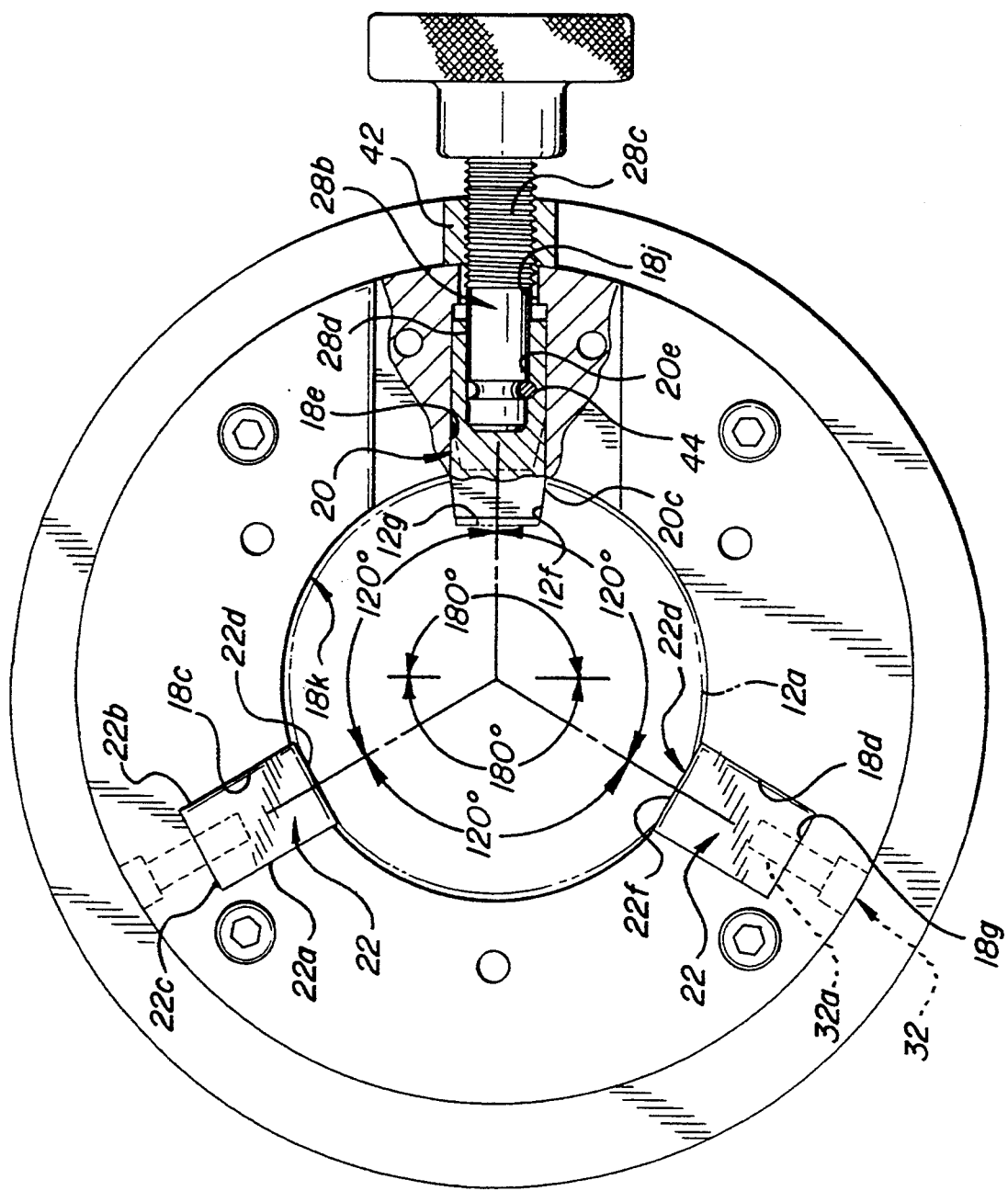
FIG. 9 is a somewhat schematic plan view showing the operation of the invention tool holder assembly.

The advanced or operative position of the wedge block 20 within the well 18b is seen in solid lines in FIG. 9 and the withdrawn position of the wedge block tip 20a, removed from the well 18b, is seen in dash lines in FIG. 9. It will be seen that the tip 20a of the wedge block has a wedge shaped configuration and specifically includes angled wedge faces 20b and 20c and an inboard end face 20d. Wedge faces 20b and 20c are angled at an angle corresponding to the angle of tool recess wedge faces 12e and 12f so that the wedge tip 20a may enter the recess 12d to accurately angularly position the tool within the well 18b. Angled wedge faces 20b and 20c and angled wedge faces 12e and 12f are relatively dimensioned such that with faces 20b and 20c fully engaged with faces 12e and 12f the inboard face 20d of the tip of the wedge block is spaced from the bottom wall 12g of the recess.

Each pad block 22 has a generally rectangular configuration and is sized to fit slidably in a respective recess 18c/18d. Each pad block 22 includes side faces 22a and 22b, an outboard face 22c, an inboard face 22d, a bottom face 22e, and an upwardly angled upper face 22f conforming to the upward angle of the conical upper surface 8f of the annular wall portion 18a of tool holder member 18. As best seen in FIG. 9, each pad block 22 is positioned in a respective recess 18c/18d with the outboard face 22c of the block positioned against the outboard face 18g of the recess. The inboard face 22d of the pad block lies on a secant with respect to the circular outline of the wall 18k so that the midpoint or midline 22f of each inboard face is disposed radially inwardly of the circular wall 18k of the well 18b. The midline 22f of each secant surface 22d will be seen to be located at a common radial distance from axis 30 and it will further be seen that all other points on the circular wall 18k are located at a radial distance from axis 30 greater than the radial distance of the secant midlines 22f. Each pad block 22 is fixedly positioned in its respective recess 18c/18d by a bolt 32 passing through the annular wall of the tool holder member outboard of the recess for threaded engagement at its inner end 32a with a threaded bore opening in the outboard face 22c of the pad block so that bolts 32 operate to positively lock the pad blocks in the recesses 18c and 18d with the inboard faces 22d of the pad blocks assuming a secant relationship with respect to the circle of the well 18b.

Each clamp assembly 24 includes a hook clamp 34 and a bolt 36. Each hook clamp 34 includes a head portion 34a, including a hook lip 34b, and a lower shank portion 34c sized to fit in a respective blind bore 18g opening in the upper annular face 18f of the tool holder member. Bolt 36 passes downwardly through a central bore 34d in the hook clamp and through a counterbore 18h in the tool holder member for threaded engagement at its lower end with a threaded bore 16c in the main body portion 16a of mounting block 16. Further bolts 38 pass downwardly through the annular wall of tool holder member 18 for threaded engagement with the mounting block to fixedly position the tool holder member on the mounting block with the central axis 30 of the tool holder coincident with the central axis of the mounting block. If desired, an annular spacer plate 40 may be positioned within well 18b and on top of the upper face of the mounting block 16 to provide precise vertical positioning of the tool relative to the tool holder.

Cover 26 has a platelike configuration and is sized to fit in a recess 18i provided in the annular wall of the tool holder member above recess 18e. Cover 26 is secured within recess 18i by screws 41 and is positioned with its underface 26a in overlying relation to the wedge block 20 positioned within recess 18e so as to further define the radially extending recess within which the wedge block reciprocates.

Hand knob 28 includes a head portion 28a and a shaft portion 28b. Shaft portion 28b includes threads 28c threadably received in a nut or bar stock 42 fixedly positioned on the outer periphery of the annular wall of the tool holder member outboard of recess 18e. Shaft portion 28b further includes a forward end portion 28d passing through an aperture 18j in the annular wall portion of the tool holder member outboard of recess 18e and received in a circular bore 20e opening in the outboard face of the wedge block. The forward end portion 28d of the hand knob further defines an annular circumferential groove 28e which receives a swivel pin 44 carried by wedge block 20. It will be seen that the described arrangement allows the hand knob 28 to be rotated to radially advance and radially retract the wedge block tip portion 20b in response to the threaded engagement of threaded shaft portion 28c with the threads of bar stock member 42 with forward end portion 28d retained within bore 20e and allowed to rotate within bore 20e by swivel pin 44. It will further be seen that radially inward and outward movement of wedge tip portion 20b moves the wedge block 20 radially inwardly and outwardly between the solid line position of FIG. 9, in which the wedge block tip intrudes into the well 18b, and the dotted line position of FIG. 9, in which the wedge block tip has been withdrawn from the well.

The invention tool holder assembly will be seen to provide a simple and inexpensive arrangement for allowing the ready removal of a tool for refinishing or replacement and further allowing the quick and accurate repositioning of a refinished or replacement tool in the tool holder assembly. Specifically, to remove a tool 12 from the tool holder assembly it is simply necessary to loosen the bolts 36, move the hook clamps 34 to a rotated position in which they no longer engage the upper face of the tool, and turn the hand knob 28 to withdraw the 20b of the wedge block 20 from the tool recess 12e. Once the tip of the wedge block has been withdrawn from the recess 12e and from the well 18b, the tool may be moved slightly laterally away from the secant faces 22d and then lifted out of the well for refinishing or replacement. When inserting the refinished or replacement tool into the tool holder assembly, the tool is simply lowered into the well, moved slightly laterally to bring the outer periphery of the base of the tool into engagement with the secant surfaces 22d (and specifically into line contact with the centerlines 22f of the secant surfaces) whereafter the hand knob 28 may be rotated to move the tip 20b of the wedge block into the recess 12e of the tool. The movement of the tip of the wedge block into the recess of the tool has the effect of quickly and precisely angularly positioning the new tool within the well with the angled faces of the recess and of the tip of the wedge block cammingly coacting in the event of a slight misalignment of the recess with the wedge block to rotate the tool into a precise angular position with respect to the central axis 30.

Whereas a preferred embodiment of the invention has been illustrated and described in detail it will be apparent that various changes may be made in the disclosed embodiment without departing from the scope or spirit of the invention.

I claim:

1. A quick release tool holder assembly for use with a tool having a base and including a recess in the outer periphery of the base, the tool holder assembly defining a well positioned around the central vertical axis of the holder and toll and sized to loosely receive the base of the tool with a plurality of contact members engaging the outer periphery of the base of the tool at circumferentially spaced locations to position the base within the well, characterized in that:
    all of the contact members are located within an angular range of 180° as measured around said axis, the tool holder assembly further includes a locating member having a tip movable radially into and out of the well at a location within the remaining 180° as measured around said axis and sized to fit into the recess in the base of the tool to position the tool angularly with respect to the tool holder, and the tool holder assembly further includes a plurality of clamps mounted on the tool holder assembly in surrounding relation to the well and adapted to engage an upper annular face on the base of the tool to preclude upward displacement of the tool out of the well.

2. The combination of a quick release tool holder assembly and a tool having a base and including a wedge shaped recess in the outer periphery of the base, characterized in that:
    the tool holder assembly includes a well positioned around a central vertical axis of the holder assembly and tool and sized to loosely receive the base of the tool, a pair of contacts positioned in the well at circumferentially spaced locations about the axis, a locating member having a wedge shaped tip movable radially into and out of the well at a location spaced circumferentially from the spaced contacts and sized to fit in the wedge shaped recess in the base of the tool to position the tool angularly with respect to the tool holder assembly, and a plurality of clamps mounted on the tool holder assembly in surrounding relation to the well and adapted to engage an upper annular surface on the base of the tool to preclude upward displacement of the tool out of the well; and
    all of the contact members are positioned within an angular range of 180° as measured about the axis and the locating member is positioned at a location within the remaining 180° as measured about the axis.

3. A tool holder assembly comprising:
    a tool holder member defining an annular wall defining a well having a central axis and adapted to receive the base of a tool with the central axis of the tool coaxial with the well axis;
    a pair of fixed contact surfaces located at a common radial distance from the wall axis, spaced circumferentially about the well axis, and positioned within an angular range of 180° as measured about the well axis, all other points on the annular wall being located at a radial distance from the well axis greater than the common radial distance of the contact surfaces so that a circular tool base having a radius equal to the common radial distance and positioned in the well in seating engagement with the fixed contact surfaces will be coaxial with the well axis and will have no other engagement with the annular wall;

a locating member mounted in the tool holder member and having a tip movable radially into and out of the well at a location within the remaining 180° as measured about the well axis; and a plurality of clamps mounted on the tool holder member in surrounding relation to the well and adapted to engage in upper annular face on the base of the tool to preclude upward displacement of the tool out of the well.

* * * * *